United States Patent Office 3,523,977
Patented Aug. 11, 1970

3,523,977
PROCESS FOR PREPARING CUMENE
HYDROPEROXIDE
Cesare Reni and Luigi Lugo, Milan, Italy, assignors to
Società Italiana Resine S.p.A., Milan, Italy
No Drawing. Filed Nov. 1, 1967, Ser. No. 679,637
Claims priority, application Italy, Nov. 3, 1966,
29,553/66
Int. Cl. C07c 73/08
U.S. Cl. 260—610                  3 Claims

ABSTRACT OF THE DISCLOSURE

Cumene is oxidized to cumene hydroperoxide in the presence of the sodium salt of cumene hydroperoxide and of phenol; the phenol quantity ranges between 0.1 and 0.1% by weight with respect to the cumene and the quantity of sodium salt of cumene hydroperoxide ranges between 0.05 and 0.5% by weight with respect to cumene. Oxidation takes place at a temperature between 90 and 120° C.

---

The invention concerns an improved process for preparing cumene hydroperoxide.

The process of oxidizing cumene to its corresponding hydroperoxide which has been used in industrial practice over a long period is the first stage of a known process for the synthesis of phenol in which oxidation of cumene is followed by acid hydrolysis of the hydroperoxide to form phenol and acetone. Finally the ketone and phenol compounds are separated from each other and from the side products of reaction.

Generally, oxidation of cumene is effected in the liquid phase, in a homogeneous medium or aqueous emulsion by means of oxygen or oxygen-containing gases, preferably at a superatmospheric pressure of a few atmospheres, normally in the presence of small quantities of added substances such as caustic soda, sodium carbonate, calcium carbonate.

In order to prevent formation in these processes of unacceptably high quantities of side products, only a fraction of the supplied cumene is converted. The conversion percentage does not generally exceed values of about 25 to 30%. Attempts have been also made towards reducing the formation of side products by removing impurities in the cumene feed through suitable purification of cumene, such as by hydrogenation or scrubbing with acids and alkalis. For it is known that the presence of foreign substances in the reaction medium promoes formation of side products.

The industrial synthesis of phenol by the process referred to above makes necessary recycling of the unaltered cumene to the oxidation step. This recycled cumene should be freed from phenol in addition to further impurities before re-entering the oxidation zone. This purification, which is normally carried out by repeated extraction with aqueous sodium carbonate solutions, must cause substantially full removal of phenol which is considered as a very powerful inhibitor of the oxidation reaction, even when it is present by traces only. Thus even when the cumene is only partly converted and previously purified it is found that the resulting hydroperoxide contains about 12 to 18% of a mixture of side products essentially comprising dimethylphenyl-carbinol and acetophenone.

Applicants' prior U.S. Pat. No. 3,171,860 discloses a process of oxidizing cumene in a liquid, preferably homogeneous phase, in the presence of small quantities of the sodium salt of cumene hydroperoxide.

With the use of this accelerator high reaction rates together with very high cumene hydroperoxide outputs are obtained, which reduce the quantity of side products to values even below 6% with respect to the formed raw cumene hydroperoxide.

It has now been found that by operating in the presence of the sodium salt of cumene hydroperoxide, it is possible not only to oxidize cumene to cumene hydroperoxide in the presence of phenol, but also to improve selectivity of the reaction.

"Selectivity" as used herein is the weight ratio of raw cumene hydroperoxide to the sum of the dimethyl-phenylcarbinol and acetophenone side products.

This property, which reaches maximum values of about 8–9 when utilizing for oxidation substances such as sodium carbonate or alkali or earth alkali carbonates, rises to over and above 15 when utilizing the sodium salt of cumene hydroperoxide, whereas the process of the invention yields values even above 30.

The influence of phenol on the progress of oxidation is all the more surprising as it had constantly been assumed, as mentioned above, that it should have been fully removed from the reaction medium in order to convert cumene to its corresponding hydroperoxide.

The main object of the invention is therefore to provide a method of increasing selectivity of the oxidation reaction of cumene to its corresponding hydroperoxide by causing the reaction to take place in the presence of phenol.

The higher selectivity is all the more surprising in that it is known that selectivity sinks as the reaction time is longer.

In the present case phenol reduces the rate of formation of cumene hydroperoxide, though by a much smaller extent than it reduces the formation of the side products so that, all other conditions being equal, slightly longer times are required in order to retain an equivalent conversion of cumene to its hydroperoxide.

It thus becomes obvious that oxidizing cumene to its corresponding hydroperoxide in the presence of phenol, the sodium salt of cumene hydroperoxide being used as an accelerator, makes the process more attractive from an economical standpoint on account both of the improved conversion outputs and less through purification required of the recycled cumene.

Finally, the smaller quantity of side products makes recovery during subsequent steps of the process of the products from the acid hydrolysis of cumene hydroperoxide less expensive.

In carrying out the invention with the abovementioned purposes in view the slight decreases in the rate of formation of cumene hydroperoxide necessitates, the output being the same, the use of oxidising reactors of larger capacity. However, this higher initial investment is negligible as compared with the above described economical advantages.

In the practice of the invention the oxidising reaction of cumene to its corresponding hydroperoxide is carried out in a medium which is made homogeneous by means of oxygen or oxygen-containing gases, such as air. Operation can be carried out at atmospheric pressure or, preferably, in a vacuum of a few atmospheres at temperatures ranging between 90 and 120° C.

The preferred embodiment of the invention utilizes the sodium salt of cumene hydroperoxide in a quantity equalling 0.05 to 0.5% by weight of the total cumene supply.

The quantity of phenol in the reaction medium may range between 0.001 and 0.1% by weight with respect to the cumol charge, preferably 0.01% by weight.

The following examples further explain the invention without, however, implying any limitation thereof.

EXAMPLE 1

An autoclave of stainless AISI 304 steel of a 25 liter volume equipped with a reflux cooler, turbomixer, automatic expansion valve on the cooler outlet and automatic analyser for the oxygen content was charged with 10 kgs. cumene together with 300 g. of 66% cumene hydroperoxide as a primer and 50 g. sodium salt of cumene hydroperoxide. Stirring was started and the temperature was raised to 108° C. Air was injected up to a pressure of 6 atm. abs. and the air supply was adjusted to reach an oxygen content in the exhausted air of about 10% by volume. After two hours 20' from the moment the solution reached the reaction temperature, a sample was withdrawn, and was washed with a little water and analyzed.

A 23.5 by weight cumene hydroperoxide solution was thus obtained. The resulting cumene hydroperoxide contained about 6.1% dimethylphenylcarbinol and 1.0% acetophenone.

EXAMPLE 2

10 kgs. cumene, 300 g. 66% cumene hydroperoxide, 50 g. sodium salt of the cumene hydroperoxide and 0.103 g. phenol were charged to an apparatus as described in Example 1 under similar conditions.

By proceeding as described in Example 1 a sample was withdrawn 2 h. 15' from the moment the solution reached its reaction temperature.

A 24.0% by weight cumene hydroperoxide solution was obtained. The resulting cumene hydroperoxide contained about 5.8% by weight dimethylphenylcarbinol and 1.2% acetophenone.

EXAMPLE 3

10 kgs. cumene, 300 g. 66% cumene hydroperoxide, 50 g. sodium salt of the cumene hydroperoxide and 1.03 g. phenol were charged to an apparatus as described in Example 1 under similar conditions. By proceeding as described in Example 1 a sample was taken after four hours 20' from the moment the solution reached its reaction temperature.

A 26.0% by weight cumene hydroperoxide solution was obtained. The resulting cumol hydroperoxide contained about 2.5% dimethylphenylcarbinol and 0.6% acetophenone.

EXAMPLE 4

10 kgs. cumene, 300 g. 66% cumene hydroperoxide, 50 g. sodium salt of the cumene hydroperoxide and 10.3 g. phenol were charged to the apparatus described in Example 1 under similar conditions.

By proceeding as described in Example 1 a sample was taken ten hours from the moment the solution reached its reaction temperature.

A 26.5% cumene hydroperoxide solution was obtained. The resulting cumene hydroperoxide contained about 3.7 dimethylphenylcarbinol and 0.7 acetophenone.

As will be apparent from a fair reading of the examples, the process may be conducted, inter alia, at a pressure of operation within the range of from atmospheric pressure to 6 atmospheres.

We claim:
1. In the process for the oxidation of cumene to cumene hydroperoxide, in which cumene is oxidized with oxygen or a molecular oxygen containing gas in a homogeneous medium in the presence of from 0.05 to 0.5% by weight of the sodium salt of cumene hydroperoxide, based on the cumene feed, the improvement which comprises:
   performing said oxidation in the presence of from about 0.01 to about 0.1% by weight, based on the cumene feed, of phenol, at a temperature within the range 90 to 120° C., and at a pressure of at least atmospheric pressure.
2. A process as claimed in claim 1, in which the phenol quantity is about 0.01% by weight.
3. The process of claim 1 wherein the pressure of operation is within the range atmospheric to six atmospheres.

References Cited

UNITED STATES PATENTS 3,171,860   3/1965   Codignola _____ 260—610

BERNARD HELFIN, Primary Examiner

W. B. LONE, Assistant Examiner

U.S. Cl. X.R.

260—592, 618